United States Patent
Biver et al.

[11] Patent Number: 5,885,462
[45] Date of Patent: Mar. 23, 1999

[54] PROCESS FOR REDUCING THE CONCENTRATION OF MULTIVALENT CATIONS IN AQUEOUS SOLUTIONS

[75] Inventors: Claudine Biver, Rueil-Malmasion; Jean-Pierre Cuer, Craponne; Francois Delmas, Saint-Foy-les-Lyon; Francois Garcia, Brignais, all of France

[73] Assignee: Elf Atochem S.A., Puteaux, France

[21] Appl. No.: 793,461

[22] PCT Filed: Aug. 8, 1995

[86] PCT No.: PCT/FR95/01063

§ 371 Date: May 5, 1997

§ 102(e) Date: May 5, 1997

[87] PCT Pub. No.: WO96/06677

PCT Pub. Date: Mar. 7, 1996

[30] Foreign Application Priority Data

Aug. 26, 1994 [FR] France .................................. 94/10318

[51] Int. Cl.⁶ .............................. B01J 47/10; C25D 21/22
[52] U.S. Cl. .......................... 210/661; 210/688; 210/266; 210/268; 210/912
[58] Field of Search ..................... 210/679, 687, 210/681, 688, 661, 691, 266, 258, 912–914

[56] References Cited

U.S. PATENT DOCUMENTS

| | | | |
|---|---|---|---|
| 4,279,755 | 7/1981 | Himsley | 140/661 |
| 5,082,503 | 1/1992 | Webb et al. | 210/691 |
| 5,154,713 | 10/1992 | Lind | 210/691 |
| 5,314,420 | 5/1994 | Smith et al. | 210/691 |
| 5,389,166 | 2/1995 | White | 210/688 |

FOREIGN PATENT DOCUMENTS

| | | |
|---|---|---|
| 0060207 | 9/1982 | European Pat. Off. . |
| 2608457 | 6/1988 | France . |
| 2059003 | 2/1990 | Japan . |

*Primary Examiner*—Thomas G. Wyse
*Attorney, Agent, or Firm*—Burns, Doane, Swecker & Mathis, L.L.P.

[57] ABSTRACT

The process consists in passing the liquid to be purified and a superabsorbent, preferably of polyacrylic type, through a column, the upward speed of the liquid being chosen such that, in the column, the superabsorbent which is merely swollen is in a stationary dynamics regime, whereas the superabsorbent laden with polyvalent ions settles at the bottom of the column. Application to the treatment of the aqueous rinses of articles which have undergone a nickel-plating treatment.

14 Claims, 2 Drawing Sheets

COUNTERCURRENT COLUMN

COUNTERCURRENT COLUMN

COUNTERCURRENT RINSING BATHS

PROCESS FOR REDUCING THE CONCENTRATION OF MULTIVALENT CATIONS IN AQUEOUS SOLUTIONS

TECHNICAL FIELD

The present invention relates to the problem posed by the treatment of aqueous solutions laden with heavy metals, among others of industrial aqueous effluent discharges.

PRIOR ART

It has been pointed out that when superabsorbent acrylic polymers (SAP) for water and aqueous solutions, in particular polyacrylic acids, are placed in contact with a solution containing polyvalent metal ions, they initially swell in considerable proportions and then, having bound the polyvalent ions, they discharge a proportion of their swelling water. This behaviour has been applied to the purification of aqueous effluents before their discharge (see, for example, French Patent Application No. 93 06711). The phenomenon of swelling is a factor in improving the kinetics of the absorption of the ions on the polymer; however, it introduces the disadvantage of a considerable change in the volume of the absorbent bed, and this makes its use impracticable in a stationary bed column.

A consequence linked with these phenomena is the change in density of the particles of superabsorbent in the course of the absorption-swelling-deflation mechanism. The density of each particle drops first of all as a result of its considerable swelling by the aqueous solution. Thus, in the case of a polyacrylic superabsorbent with 25% in acrylic form and 75% in sodium acrylate form, this density changes from approximately 1.6 in the case of the dry particle to a value close to 1 in the case of the swollen particle, the composition of which is then, very approximately: polyacrylate 1 to 5% (by weight), water 90–95%, and then this density rises again as a result of the expulsion of a large proportion of the water and of the trapping of the heavy ions. Depending on the ion trapped, this density then lies between 1.1 and 1.5 g/cm$^3$. These phenomena used to be treated as a curiosity; in any event, they had never found any application until now.

OUTLINE OF THE INVENTION

The present invention is based on the original idea that, if a particulate superabsorbent is suspended in a vertical vein of a solution of polyvalent ions which is propelled with an upward motion such that the particles in their state of maximum swelling are in a state of stationary dynamic regime, that is to say that they do not settle, nor are they entrained in the liquid vein, then all the particles which will have been laden with heavy ions will take part in settling and will be recoverable at the bottom of the column. The invention thus consists of a process for lowering the content of polyvalent cations in aqueous solutions by adsorption of the said heavy cations onto a superabsorbent polymer, carried out in a column fed at the top with a superabsorbent and at its bottom with the aqueous solution to be extracted, and drained at the top of the purified solution and at the bottom of the enriched superabsorbent, characterized in that the aqueous solution travels in the body of the column with an upward motion the speed of which is lower than the speed of settling of the said superabsorbent when it is laden with polyvalent cation ions.

SUMMARY DESCRIPTION OF THE DRAWINGS

Figure 1:
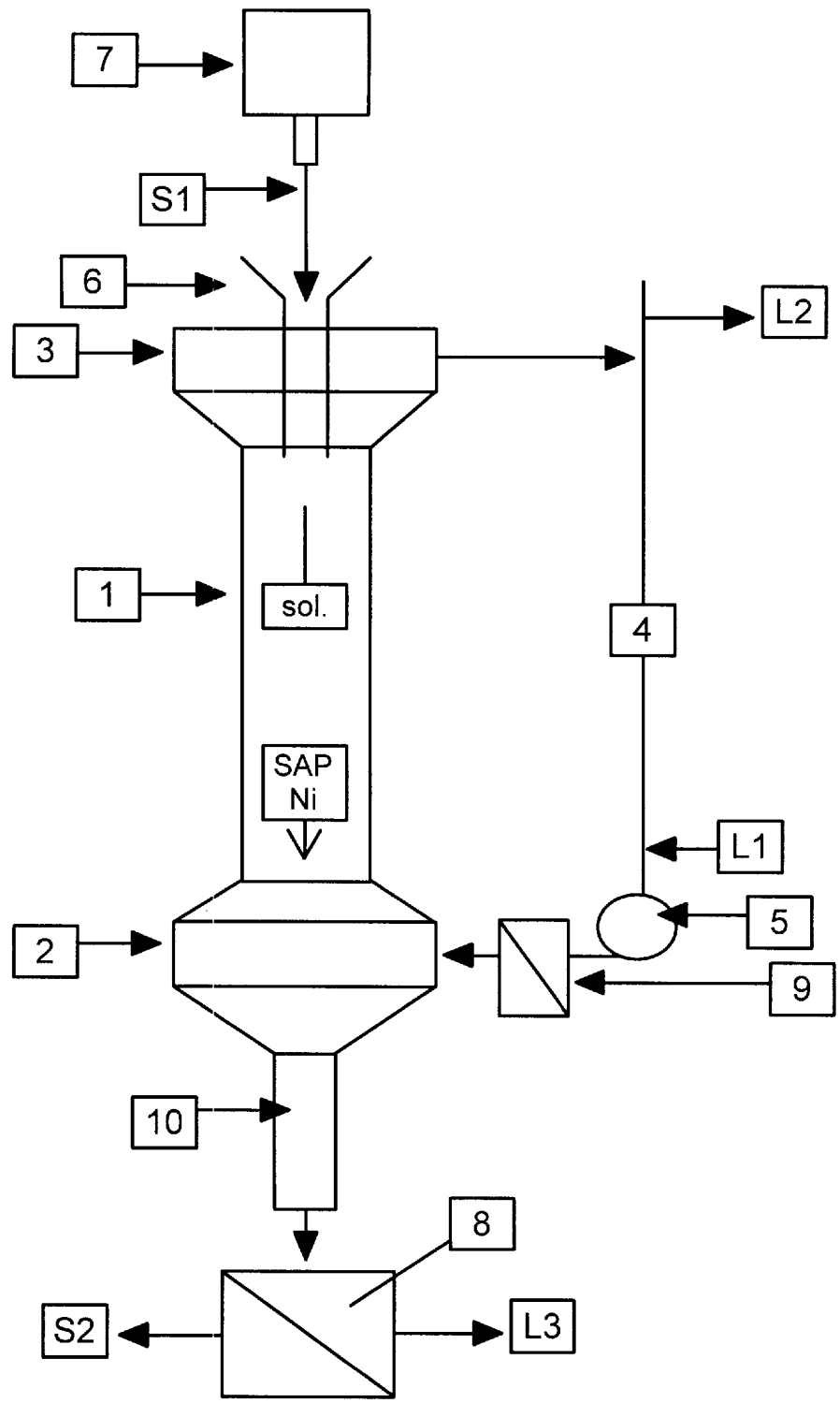
FIG. 1 depicts a countercurrent column for the treatment of aqueous solutions laden with heavy metals.

The process is implemented in a column the diagram of which is given in FIG. 1. This comprises a cylindrical body 1 mounted on a column bottom 2, supporting a widening 3 which opens onto a circulation circuit 4 looped back to the bottom of the column and driven by a pump 5. The bottom of the column is extended by a cone or else a tube 10 approximately 1.5 litres in volume. The whole dead volume of the plant is first of all filled with solution to be purified via the entry (L1). In a regime state, the system operates as follows. The dry or wet SAP is introduced continuously at the level (S1) via a plunging funnel 6, from a hopper 7. The liquid to be purified is introduced continuously at the level (L1), while, on the one hand, purified liquid overflowing at the level (L2) and, on the other hand, the SAP saturated with heavy ions and settled in the low part 10 of the bottom of the column are drained off. A dewatering device 8 attached to the column or outside makes it possible to separate (S2) a dewatered SAP and a dewatering liquid (L3) which may be either recycled at (L1) or added to the discharges (L2). A filter 9 may be optionally inserted into the circulation circuit. The throughput of the pump 5 is adjusted to make the upward speed of the liquid in the body of the column correspond to the stationary regime of the SAP particles which have just been swollen. In these conditions the aqueous solution in the body of the column leaves behind in the superabsorbent polymer the quantity of heavy ions corresponding to at least 60% of its absorption capacity for heavy ions. To give an example, the speed of fall of an SAP swollen in water or the aqueous solutions which have approximately the same viscosity is approximately 20 metres per hour, and that of the same SAP saturated with nickel is approximately 75 m/h, and the operating point is that corresponding to a pump throughput producing a liquid motion of 20 m/h in the body of the column. Similar changes in volume are obtained during the complexing of copper and of calcium.

BASIC PRINCIPLES FOR CARRYING OUT THE INVENTION

The SAPs which can be used for the invention are crosslinked polymers of acrylic or methacrylic acid or of their alkali metal salts, or their copolymers with other unsaturated monomers, it being possible for the said unsaturated monomers to be alkenes such as ethylene, propylene or styrene, or else other acrylic monomers like acrylamide, or sulphonic acids, such as acrylamidomethylpropanesulphonic acid, or acrylic or methacrylic acid derivatives containing metal-complexing functional groups, for example aspartic acid or iminoacetic acid functional groups, the latter ones being very effective when the aqueous solution to be treated contains strong metal-complexants such as citric acid or EDTA or their alkali metal salts, and the like.

These polymers are produced with a crosslinking agent content of between 0.005% and 5% and preferably between 0.01% and 5% by weight, relative to the sum of the constituent monomers. These are products which are insoluble in aqueous solutions which, nevertheless, as soon as they are dispersed, swell and thus absorb quantities of water of the order of 10 to more than 1000 g per g of polymer.

The description of such products as superabsorbent acrylic powders will be found in patents EP 0176664

(Seitetsu Kagaku Co.), EP 0275763 (Société chimique de charbonnages de France), EP 0441507 (Seitetsu Kagaku Co.), or else in French Patent Application No. FR 9209959 (Elf Atochem S.A.). These polymers may be employed either in the form of individual particles, taken as such, the size of which in the dry state is advantageously larger than 50 µm, or in the form of agglomerates of individual particles.

Various alternative forms of the process also form part of the invention. In particular, the process can accept SAPs other than dry ones, for example products originating from the regeneration of the SAPs collected at the bottom of the column.

EXAMPLES

Example 1

A column produced according to the diagram of FIG. 1 comprises a cylindrical body 1 with a diameter of 0.07 m and a height of approximately 1.20 m. The pump 5 operates in a regime such that the upward speed of the liquid in the body of the column is stabilized at 15–20 m/h. It is fed, on the one hand, with dry SAP (Elf Atochem S.A. Aquakeep® 50 D, an SAP with 25% in acrylic form and 75% in the form of sodium acrylate) at a rate of 50 g/h and, on the other hand, with nickel sulphate solution assaying at 5 g of Ni++ per litre, at a rate of 2 l/h. The following are drawn off: at (L2), continuously, at a rate of 1 l/h, an aqueous solution which now assays at only 0.1 g/l of nickel, and, semicontinuously at the bottom of the column, on average at a rate of 1 kg/h, a slurry of nickel-laden SAP which settles in the bottom part 10 of the column and which is separated at 8 into an SAP containing 0.2 g of nickel per gram of SAP introduced, directed towards a cell for reprocessing, and into an impregnating liquid which is a solution containing 0.1 g/l of nickel, which is combined with the effluents (L2).

The liquid which overflows at the top of the column is a clear liquid, the speed of the liquid being broken in the widening 3 to a value which is much lower than the speed of settling of the wet SAP which moves back down into the body of the column.

Example 2 (counterexample)

The column is that described in Example 1, operating in the conditions of Example 1, with the difference that the upward speed of the liquid in the body of the column is controlled at 13 m/h. An aqueous solution which assays at 0.25 g/l of nickel is drawn off continuously at (L2) at a rate of 1 l/h. 0.1 kg/h of solid (S2) and 0.9 kg/h of liquid (L3) are recovered at the bottom of the column.

The example shows that, with an upward speed which is lower than in Example 1, the time of contact between the superabsorbent and the solution to be drained decreases and that the efficiency of the superabsorbent deteriorates (0.25 g/l at L2, against 0.1 previously).

Example 3 (counterexample)

The column is that described in Example 1, operating in the conditions of Example 1, the difference being that the upward speed of the liquid in the body of the column is controlled at 25 m/h. An accumulation of SAP is observed in the top part of the body of the column. As a result a quarter of the quantity of SAP introduced is entrained into the recirculation loop via 4 and is stopped at the filter 9.

After 30 minutes' operation the introduction of SAP must be stopped because the adsorbent which accumulates at the top of the column blocks the entry of new SAP.

Example 4

Insertion of the device according to the invention into a line for rinsing articles which have been subjected to a chemical nickel-plating treatment.

The example illustrates the advantage which is found when employing SAPs for:
  recovering a large quantity of nickel and thus making the subsequent treatments easier. In the case of precipitation: the volume of sludge is reduced. In the case of resins: the operating life of the resins is increased.
  decreasing the quantity of aqueous rinses employed while having a sufficient rinsing quality.

Figure 2:
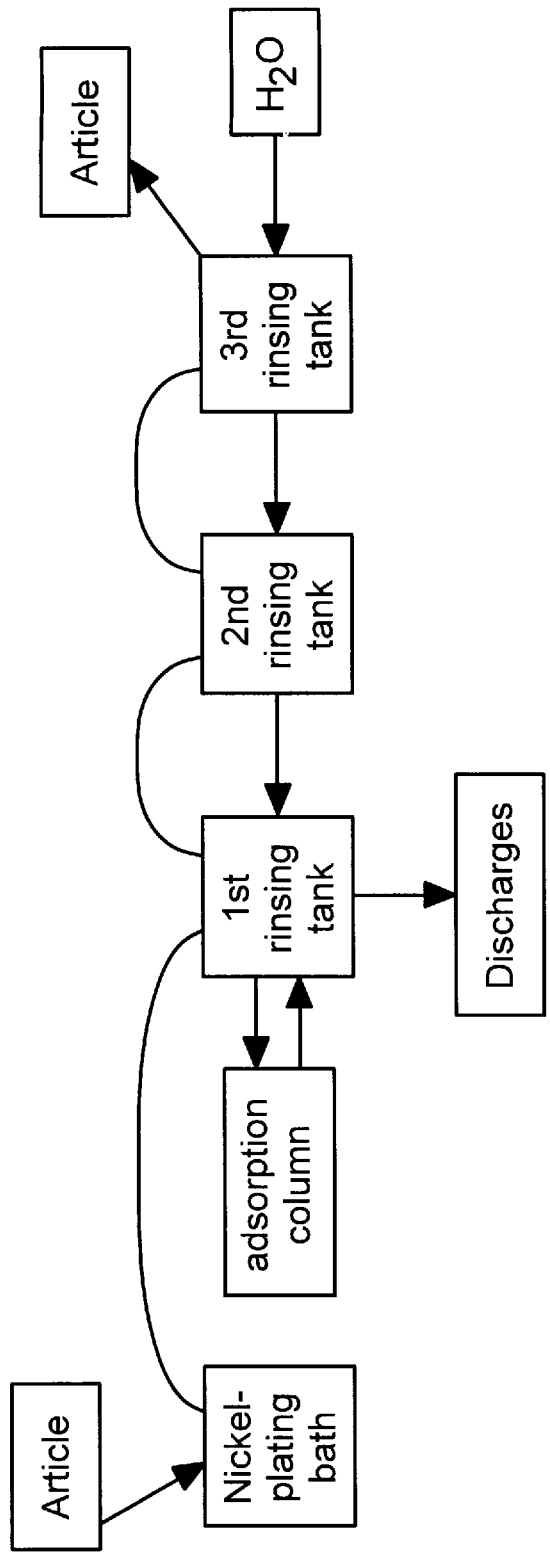
FIG. 2 describes the series of steps involved in the countercurrent rinsing bath of the present invention.

On leaving the nickel-plating bath, the freshly nickel-plated articles pass countercurrentwise through a series of rinsing tanks as shown in FIG. 2. The column for treatment according to the invention is added onto the first rinsing tank, which may be static or countercurrent.

The table below summarizes various results obtained according to the arrangement of the rinsing line, with the following parameters:
  nickel concentration of the baths=5 g/l;
  entrainment=0.2 l/m$^2$;
  efficiency of the SAP=0.1 g/l (this is the nickel concentration maintained in the first rinsing tank by virtue of the SAP treatment column);
  nickel capacity of the SAP=0.1 g/g;
  partition coefficient=10 l/g (this partition coefficient is the ratio of the nickel concentration in the SAP to the nickel concentration in the solution).

Summarizing Table

| Tanks | Adsorption column | Throughput l/m$^2$ | SAP conc. g/m$^2$ | % Ni recovered | Rd (Ni) | Rd without SAP |
|---|---|---|---|---|---|---|
| 3 CC | no | 3 | | 0 | 3500 | 3500 |
| 3 CC | yes | 2 | 8 | 80 | 5500 | 1000 |
| 1 "static" + 2C | yes | 2 | 10 | 98 | 5000 | <500 |
| 1 "static" + 2C | yes | 5 | 10 | 98 | 31 250 | 1250 |
| 1 "static" + 2C | yes | 8 | 10 | 98 | 80 000 | 3200 |
| 1 "static" + 2C | no | 8 | 0 | 0 | 3200 | 3200 |
| 2 CC | yes | 8 | 2 | 20 | 2000 | 1600 |
| 2 CC | yes + CC | 6 | 4 | 40 | 4000 | 1000 |

(a) 3 CC: 3 countercurrent rinsing tanks.
(b) 2 CC: 2 countercurrent rinsing tanks.
(c) 1 "static" + 2CC: 1 static rinsing tank and 2 countercurrent rinsing tanks.
(d) throughput (l/m$^2$): quantity of rinsing water employed per m$^2$ of treated surface.
(e) SAP (g/m$^2$): quantity of SAP introduced into the column per m$^2$ of treated surface.
(f) % Ni recovered by the SAP.
(g) $R_d$ is the dilution ratio, that is to say the concentration ratio between the deposition bath, which is concentrated, and the last rinsing tank, the most dilute one. This parameter is conventionally employed by surface processors. In general, they accept that, in order to have an effective rinsing, $R_d$ > 1000 is required. This naturally applies to every constituent of the bath.

Here, the $R'_d$ (without SAP) is the dilution ratio obtained in the rinsing conditions being considered (number of tanks, water throughput, static or countercurrent rinsing) without employing any SAP. It applies to all the constituents of the bath. $R_d$(Ni) is the nickel dilution ratio obtained by employing the SAP column and optionally dispersed SAP. Since the SAP acts only on the nickel (or other polyvalent cation present), the dilution ratio of the other constituents of the nickel-plating bath (for example phosphites, organic acids, etc.) remains equal to $R_d$ (without SAP).

In the column of the table headed "column", "yes" indicates the use of the SAP column on the first rinsing tank, and "no" the conventional operation without the SAP column, and "yes+CC" (cf. last line) the use of the SAP column on the first rinsing tank plus an improvement in the treatment which consists in dispersing SAP in the second rinsing tank, which SAP, not being fully saturated with nickel, is entrained by the rinsing water towards the first tank in order to be finally found, once saturated, at the bottom of the SAP column. It can be seen in the table that this combined treatment (SAP column+dispersed SAP) makes it possible to recover twice as much nickel and to employ 6 l/m$^2$ of rinsing water instead of 8.

The process is above all intended to lower the content of heavy ions in aqueous solutions at average concentration. If necessary, an additional treatment may be used in combination with this technique, for example passing over ion exchange resins in order to bring these solutions to a virtually zero level of heavy ion content. The present process will then be employed to its full capacity, since the standard ion exchange columns which treat effluents directly become saturated too rapidly to be technically and economically viable when the leading concentration of heavy ions is too high.

POSSIBILITIES OF INDUSTRIAL APPLICATION

The process becomes very particularly advantageous in chemical or electrolytic nickel-plating plants, where the problem arises of the removal of effluents from rinsing of the nickel-plated articles, which the assay shows to contain several hundred mg/l of nickel. However, it is not restricted to this ion, but can just as well be applied to effluents containing copper, zinc, chromium, cadmium and lead, which can be present in the effluents of the surface-treatment industries, or else to any other cation of the metals of groups I B, II B, III A, IV A, VI B, VII B and VIII of the Periodic Classification (as found in the Handbook of Chemistry and Physics, CRC Press, 1980), insofar as these cations give rise to sufficient density changes when they are bound in the SAPs.

We claim:

1. Process for lowering the content of polyvalent cations in aqueous solutions by adsorption of said heavy cations onto a superabsorbent polymer, carried out in a column fed at the top with a superabsorbent and at its bottom with the aqueous solution to be extracted, and drained at the top of the purified aqueous solution and at the bottom of the enriched superabsorbent, wherein the effluent travels in the body of the column with an upward motion the speed of which is lower than the speed of settling of the said superabsorbent when it is laden with polyvalent cation ions.

2. Process according to claim 1, wherein the upward speed of the solution in the body of the column is such that the quantity of heavy ions which is bound in the superabsorbent polymer corresponds to at least 60% of its absorption capacity for heavy ions.

3. Process according to claim 1, wherein the superabsorbent polymer is a product which is insoluble but swells in aqueous solutions, consisting of a crosslinked polymer of acrylic or methacrylic acid or of their alkali metal salts, or a copolymer with other unsaturated monomers.

4. Process according to claim 3, wherein the products which are insoluble but swell in aqueous solutions are crosslinked copolymers of acrylic or methacrylic acid with alkenes.

5. Process according to claim 4, wherein said alkenes are ethylene, propylene or styrene.

6. Process according to claim 3, wherein the products which are insoluble but swell in the aqueous solutions are crosslinked copolymers of acrylic or methacrylic acid with other acrylic monomers sulphonic acids, acrylic or methacrylic acid derivatives containing metal-complexing functional groups, iminoacetic acid functional groups or their alkali metal salts.

7. Process according to claim 6, wherein said acrylic monomers are acrylamide.

8. Process according to claim 6, wherein said sulphonic acids are acrylamidomethylpropanesulphonic acid.

9. Process according to claim 6, wherein said metal-complexing functional groups are aspartic acid.

10. Process according to claim 1, wherein the superabsorbent polymer is a crosslinked polymer of acrylic or methacrylic acid and of their sodium salts.

11. Process according to claim 1, wherein the polyvalent cations are copper, zinc, chromium, cadmium, lead or any other cation of the metals of groups I B, II B, III A, IV A, VI B, VII B and VIII of the Periodic Classification.

12. Process according to claim 1, wherein the polyvalent cations are nickel cations.

13. Plant for rinsing articles coming out of a chemical or electrolytic nickel-plating treatment bath, comprising at least one rinsing tank and several countercurrent rinsing tanks in parallel with the single rinsing tank or with the first rinsing tank, comprising a column fed at the top with a superabsorbent and at its bottom with an aqueous effluent to be extracted, and drained at the top of the purified effluent and at the bottom of the enriched superabsorbent, wherein the effluent travels in the body of the column with an upward motion the speed of which is lower than the speed of settling of said superabsorbent when it is laden with polyvalent cation ions.

14. Plant for rinsing articles coming out of a chemical or electrolytic nickel-plating treatment bath according to claim 13, comprising superabsorbent polymers.

* * * * *